United States Patent [19]

Scoggin

[11] 4,043,773
[45] Aug. 23, 1977

[54] RECOVERY OF POLYMER PARTICLES ENTRAINED IN TANK VENT

[75] Inventor: Jack S. Scoggin, Bartlesville, Okla.

[73] Assignee: Phillips Petroleum Company, Bartlesville, Okla.

[21] Appl. No.: 684,987

[22] Filed: May 10, 1976

[51] Int. Cl.² ............................................. B01D 47/14
[52] U.S. Cl. ........................................ 55/228; 55/233
[58] Field of Search ..................... 55/85, 89, 90, 228, 55/233

[56] References Cited

U.S. PATENT DOCUMENTS

| 2,788,954 | 4/1957 | Paasche ............................. 55/228 X |
| 2,953,557 | 9/1960 | Wride et al. .................... 260/94.9 F |
| 3,047,565 | 7/1962 | Braun et al. ......................... 55/89 X |
| 3,516,230 | 6/1970 | Saubesty ............................... 55/228 |
| 3,681,897 | 8/1972 | Mitchell et al. .................. 55/228 X |
| 3,789,586 | 2/1974 | Arnold et al. ........................ 55/228 |

*Primary Examiner*—Thomas G. Wyse
*Assistant Examiner*—Robert H. Spitzer

[57] ABSTRACT

An apparatus is provided for recovering the particles entrained in a vaporous vent by passing the vent into a scrubber which uses as scrubbing liquid a liquid in which the particles are buoyant, maintaining a liquid level of scrubbing liquid in the base of the scrubber with overflow of floating polymer particles and scrubbing liquid from the surface of the liquid level. The particles can be passed back to the tank from which the particles were originally vented. A scrubbed, particle-free, vent gas is removed from the top of the scrubber and the scrubbing liquid can be recycled from the base of the scrubber for recontact with the vaporous vent containing particulate matter.

4 Claims, 1 Drawing Figure

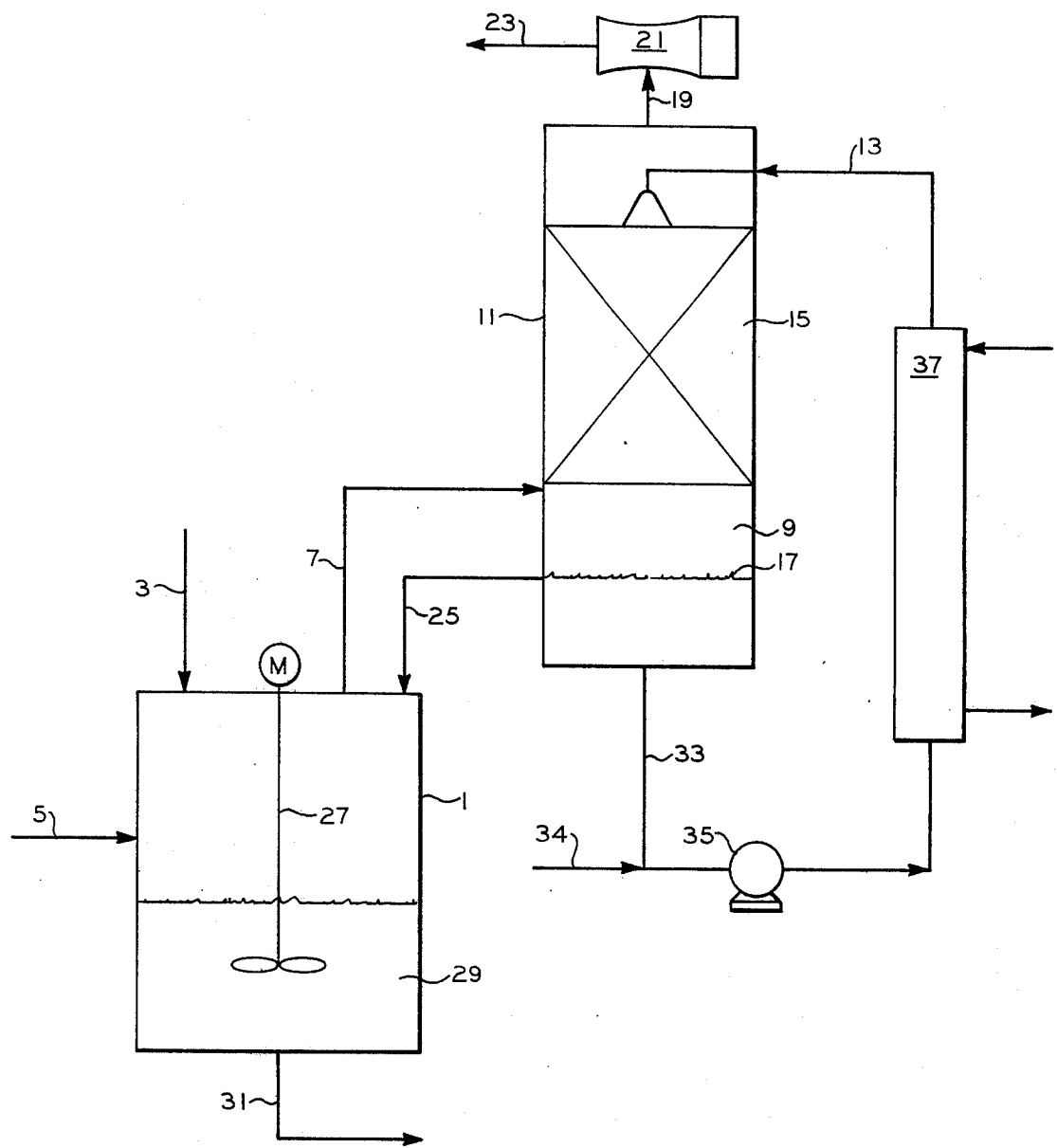

RECOVERY OF POLYMER PARTICLES ENTRAINED IN TANK VENT

BACKGROUND OF THE INVENTION

This invention relates to the recovery of particulate matter from vent gases. In one of its aspects this invention relates to the scrubbing of vent gases. In another of its aspects this invention relates to the overflow of floating particulate matter from the surface of the liquid level of a scrubbing vessel.

In many processes, vaporous vent streams are produced in which particulate matter is entrained to be carried out of the process. The usual approach to recovery of this particulate matter or the clearing of the vaporous vent of the particulate matter is the insertion of a means for filtering in the vent line. Although filters are efficient, they are subject to blinding with subsequent buildup of back pressure in the system and require periodic backflow or other means for removing filtered material from the filter surfaces.

I have discovered that for particulate matter such as most resinous polymeric substances that are buoyant in liquids, that a scrubbing operation with a liquid in which the particulate matter is buoyant can be used both to clear the vent gases of particulate matter and to recover the buoyant particulate matter.

It is therefore an object of this invention to provide an apparatus for recovering particulate matter that has been entrained in a vaporous stream. It is another object of this invention to provide apparatus for returning particulate matter recovered from a vent stream to the vessel from which it was vented. It is still another object of this invention to provide apparatus for a continuous system of clearing particulate matter from a vent stream and returning the particulate matter to the vessel from which it was vented.

Other aspects, objects and the various advantages of this invention will become apparent upon reading this specification and the appended claims.

STATEMENT OF THE INVENTION

In accordance with this invention an apparatus is provided for the recovery of particles entrained in a vaporous stream. The apparatus comprises a scrubber with an inlet through which a scrubbing liquid in which the particles are buoyant can be admitted and a vaporous vent above the scrubbing liquid inlet. The scrubber also comprises a means of overflow from a point in the scrubber below the entrance into the scrubber of the inlet line for vaporous vent containing particulate matter. Means for removing scrubber liquid is provided below the liquid level in the base of the scrubber. A means for maintaining an overflow from the liquid level surface of the scrubber through the liquid overflow line provides for passage of buoyant particles from the scrubber preferably to another tank, more preferably to the tank from which the particles were entrained in a vaporous vent.

In a preferred embodiment of the invention the scrubbing apparatus will be mounted at a sufficient elevation in relation to the vessel to which scrubber liquid and buoyant particles overflow that a flow can be maintained from the surface of the liquid level in the scrubber to the vapor space of the receiving vessel by gravity means alone.

Also in accordance with the invention a method for using the apparatus is provided for recovering particles entrained in a vaporous stream by passing the vaporous stream into the vapor space above the liquid level and below the scrubbing liquid inlet of a scrubber column; maintaining in the base of the scrubber column a liquid level of scrubbing liquid in which the particulate matter is buoyant; overflowing liquid and buoyant particles from the scrubber at the surface of the liquid level into a receiving tank; and removing scrubbed vaporous vent from the scrubber.

In one preferred embodiment, vent gas containing particulate matter is treated according to the method of this invention and the particulate matter is overflowed into the tank from which the vent containing entrained solids originally came. It is also within the scope of this invention to remove scrubbing liquid from the base of the scrubber column to recycle this liquid to the top of the scrubber as scrubbing medium.

In general, this invention should be applicable for use with any entrainable particulate matter and a liquid in which the particulate matter is buoyant with a further proviso that the liquid be suitable as a scrubbing liquid for the vaporous stream in which the particulate matter is entrained; for instance, the vapor pressure of the scrubbing liquid must be such that scrubbing liquid is not carried overhead in the vent gas from the scrubber. In a system in which particulate matter is being removed from a vent gas and the particulate matter overflowed to the system from which it came, the scrubbing liquid must be compatible with the system to which it is overflowed. In general, a liquid that is part of the mixture in the vessel to which the particulate matter is overflowed would be suitable as a scrubbing liquid.

In general, any elongated upright vessel having means for counter-current flow of scrubbing liquid and vapor to be scrubbed can be used in this invention as long as there is a sidedraw means for withdrawing overflow at the liquid level. A preferred scrubber provides for introduction of vapor to be scrubbed above the liquid level and below a packed section within the tank with both the introduction of scrubbing liquid and vent of scrubbed gas above the packed section.

The invention can best be understood in light of the attached drawing which will be described in conjunction with the removal of poly(phenylene sulfide) particles from the vent of a hot water extraction process in which salt contaminant is removed from poly(phenylene sulfide) slurry. The drawing is a flow diagram for such a system.

As background for this example it can be pointed out that in the hot water extraction of poly(phenylene sulfide) in a process such as shown in U.S. Pat. NO. 3,707,528 to remove salt contaminant which is a co-product of the reaction of p-dichlorobenzene with sodium sulfide from a treated slurry of poly(phenylene sulfide) considerable foaming is encountered during the liberation of entrained air and vaporizing water from the slurry which must be kept vigorously agitated at near the boiling point of water. The evolving vapor entrains finely divided particles of poly(phenylene sulfide) which should be recovered for return to the system.

Referring now to the drawing, a hot mixture of poly(phenylene sulfide) and salt, NaCl, is admitted to chamber 1 through line 3. Water is added through line 5 to extract the salt from the polymer-salt mixture generating a considerable amount of steam. Since the polymer is difficult to wet, polymer dust is entrained in the vent stream 7 along with air and steam and is transferred into the vapor space 9 of scrubber tank 11 where it is contacted with scrubbing water from line 13. Preferably, scrubber 11 is a packed column having a packing section 15 through which the water is discharged above the inlet of vent line 7. The entrained particulate matter is washed from the gases and collects at the surface of the liquid level 17 within the scrubber tank 11. The gaseous components of the vent stream travel upward through the scrubber and out vent line 19 above the inlet of the scrubbing water. The venting of gases from the scrubber can be aided by an ejector 21. The gases can be vented to the atmosphere or for collection for further treatment.

The polymer which is buoyant in the scrubber water collects at the surface of the liquid level 17 and is overflowed through line 25 back to the vapor space of tank 1. A liquid level sufficient to overflow from the base of the scrubber can be maintained by restricting the flow from the base of the scrubber, by using flow control means, or by supplying an excess of scrubbing liquid. The excess scrubbing liquid can be supplied by condensing steam in the scrubber. The high degree of agitation in this tank mechanically produced by agitator 27 is sufficient to mix most of the returning polymer with the polymer-water slurry 29 in the tank for discharge through line 31 for further treatment.

In the scrubber, water from the base of the scrubber can be circulated through line 33 using pump 35 back through line 13 as scrubber liquid in a continuous scrubbing process. Makeup water can be added as necessary through line 34 to maintain the overflow level in the scrubber. It is desirable in this system to cool the recycling scrubber water by indirect contact with cooling liquid in heat exchanger 37 before return to the top of the scrubber as scrubbing liquid. The recycling scrubber water can be subcooled to provide direct heat exchange medium for condensing steam in the scrubber.

The following material balance provides an example of flows stated in kg/hr for this process.

|  | Polymer Salt Feed | Wash Water | Slurry Tank Vapor | Scrubber Overflow | Recirculating Quench Water | Vent Gas | Polymer Slurry to Dewatering |
|---|---|---|---|---|---|---|---|
|  | Line 3 | Line 5 | Line 7 | Line 25 | Line 13 | Line 19 | Line 31 |
| Polymer | 2,300 |  | 23 | 23 |  |  | 2,300 |
| NaCl | 2,490 |  |  |  |  |  | 2,490 |
| Air | 172 |  | 172 |  |  | 172 |  |
| Water |  | 9,200 |  | 76 | 21,787 |  | 9,185 |
| Steam |  |  | 91 |  |  | 15 |  |
| Totals | 4,962 | 9,200 | 286 | 99 | 21,787 | 187 | 13,975 |

I claim:

1. An apparatus for recovery of particles entrained in a vaporous vent comprising (1) a scrubber and (2) tankage with said scrubber comprising:
   a. inlet for scrubbing liquid,
   b. vent for vapor above the scrubbing liquid inlet,
   c. liquid outlet at the base of the scrubber for removal of scrubbing liquid,
   d. a second liquid outlet sufficiently above the scrubbing liquid outlet to maintain a liquid level in the base of the scrubber with overflow from the second outlet,
   e. means for maintaining a liquid level in the scrubber base, and
   f. inlet for vaporous vent containing entrained particles above second liquid outlet and below the scrubber liquid inlet and said tankage comprising:
   g. a tank, connected by
   h. a first conduit to permit venting through said conduit from the tank to the inlet for vaporous vent of the scrubber, and connected by
   i. conduit from the second liquid outlet of the scrubber to the vent space of the tank, said tank positioned sufficiently lower than said scrubber to provide gravity flow of liquid from the second liquid outlet of the scrubber to the vent space of the tank.

2. An apparatus of claim 1 further comprising a packed section between the inlet for vaporous vent and the scrubber liquid inlet of the scrubber.

3. An apparatus of claim 1 further comprising means for circulating liquid from the scrubber liquid outlet to the scrubber liquid inlet of the scrubber.

4. An apparatus of claim 3 further comprising means for cooling said circulating liquid.

* * * * *